United States Patent [19]

Bush et al.

[11] Patent Number: 4,581,207

[45] Date of Patent: Apr. 8, 1986

[54] RECOVERY OF ALUMINUM FROM SPENT LIQUOR

[75] Inventors: J. Finley Bush, New Kensington; Paul J. The, Murrysville, both of Pa.

[73] Assignee: Aluminum Company of America, Pittsburgh, Pa.

[21] Appl. No.: 637,743

[22] Filed: Aug. 6, 1984

Related U.S. Application Data

[63] Continuation-in-part of Ser. No. 453,353, Dec. 27, 1982, Pat. No. 4,464,347, and a continuation-in-part of Ser. No. 587,589, Mar. 8, 1984, Pat. No. 4,496,524.

[51] Int. Cl.$^4$ .......................... C01F 1/06; C01D 1/34
[52] U.S. Cl. ..................................... 423/112; 423/122; 423/127; 423/130; 423/181; 423/185; 423/186
[58] Field of Search ............... 423/112, 121, 130, 127, 423/181

[56] References Cited

U.S. PATENT DOCUMENTS

| | | | |
|---|---|---|---|
| 2,806,766 | 9/1957 | Anderson | 423/129 |
| 3,511,606 | 5/1970 | Haliff et al. | 423/184 |
| 4,172,879 | 10/1979 | Miller et al. | 423/112 |
| 4,275,042 | 6/1981 | Leuer | 423/130 |
| 4,430,310 | 2/1984 | Malito et al. | 423/121 |
| 4,464,347 | 8/1984 | Bush | 423/112 |

FOREIGN PATENT DOCUMENTS 1123184  8/1968  United Kingdom ............... 423/122

Primary Examiner—Herbert T. Carter
Attorney, Agent, or Firm—Andrew Alexander; John P. Taylor

[57] ABSTRACT

A process for the purification of spent liquor from an alumina precipitation stage is disclosed wherein the spent liquor is first contacted with 50 volume % or less ethanol to form a sodium oxalate precipitate and the, after removal of the sodium oxalate precipitate is contacted with over 50 volume % of ethanol extraction fluid to separate the mixture into a first layer comprising the ethanol and at least a portion of the caustic from the spent liquor and a second layer which comprises the remainder of the spent liquor. The spent liquor may then be subjected to a further precipitation to recover further alumina. The spent liquor remaining may be further treated in subsequent extraction steps to concentrate and dispose of undesirable impurities remaining.

7 Claims, 6 Drawing Figures

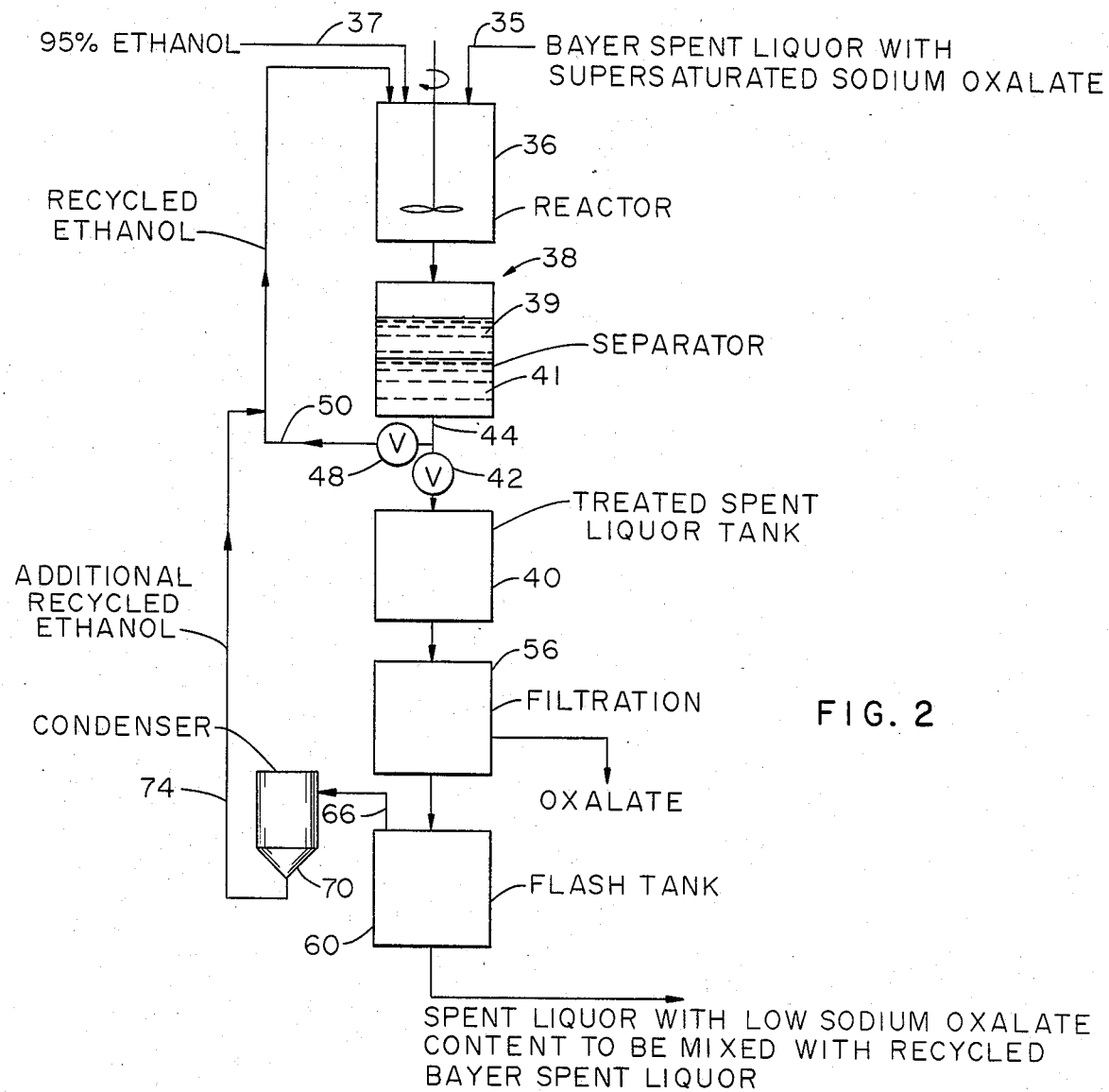
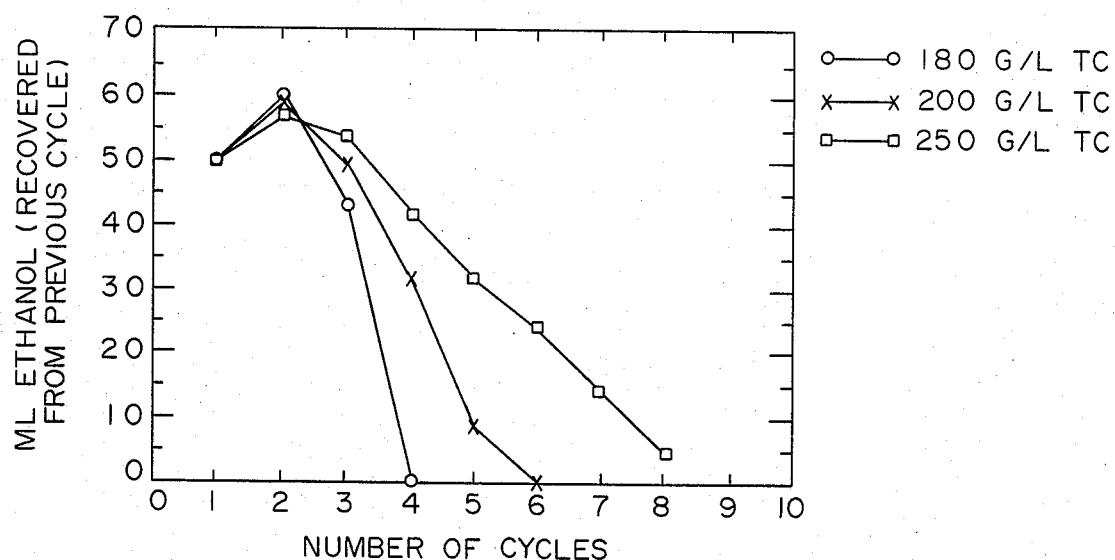
FIG. 4—OXALATE REMOVAL BY ALCOHOL EXTRACTION

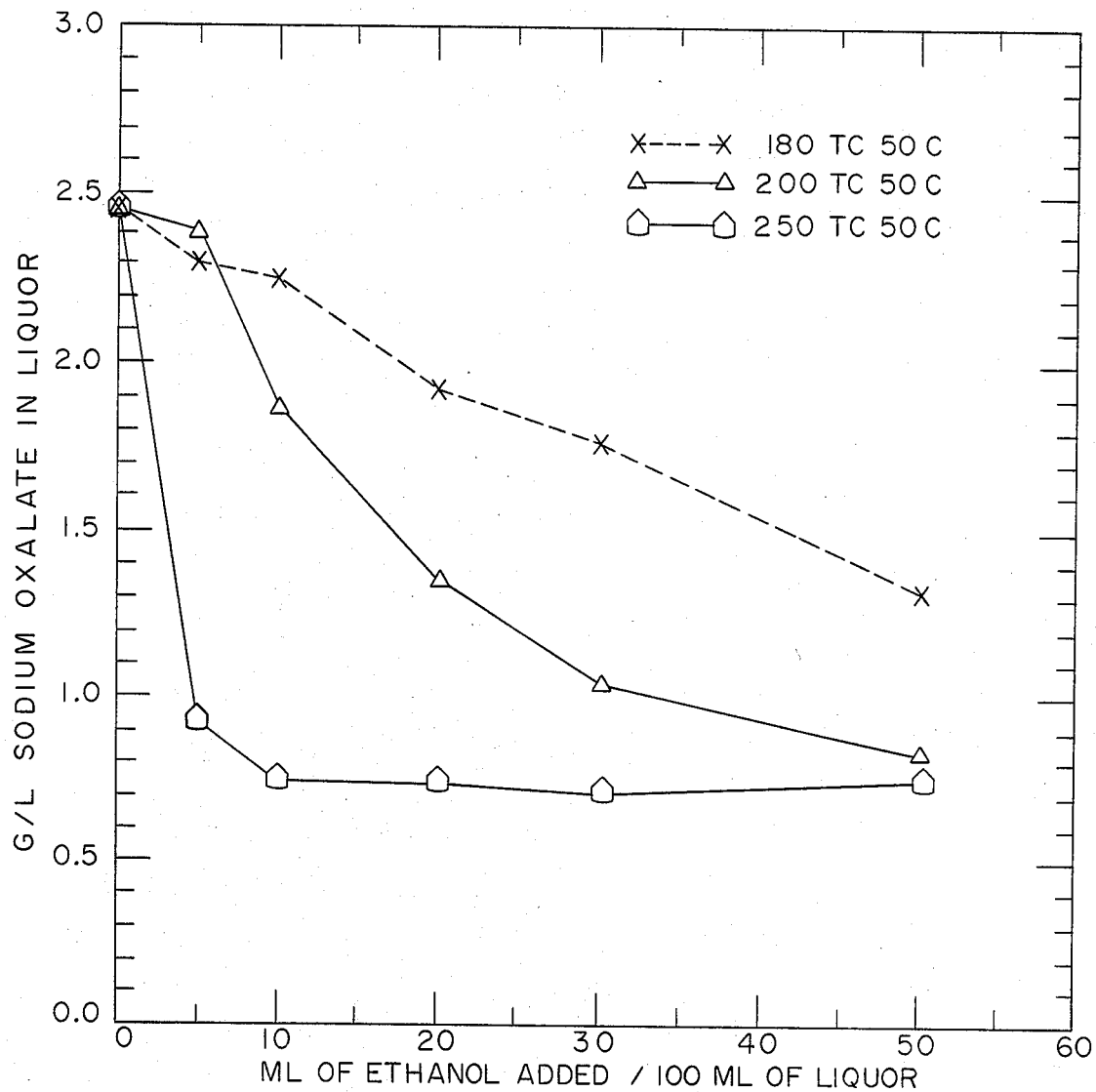
FIG.3 - OXALATE REMOVAL BY ETHANOL EXTRACTION
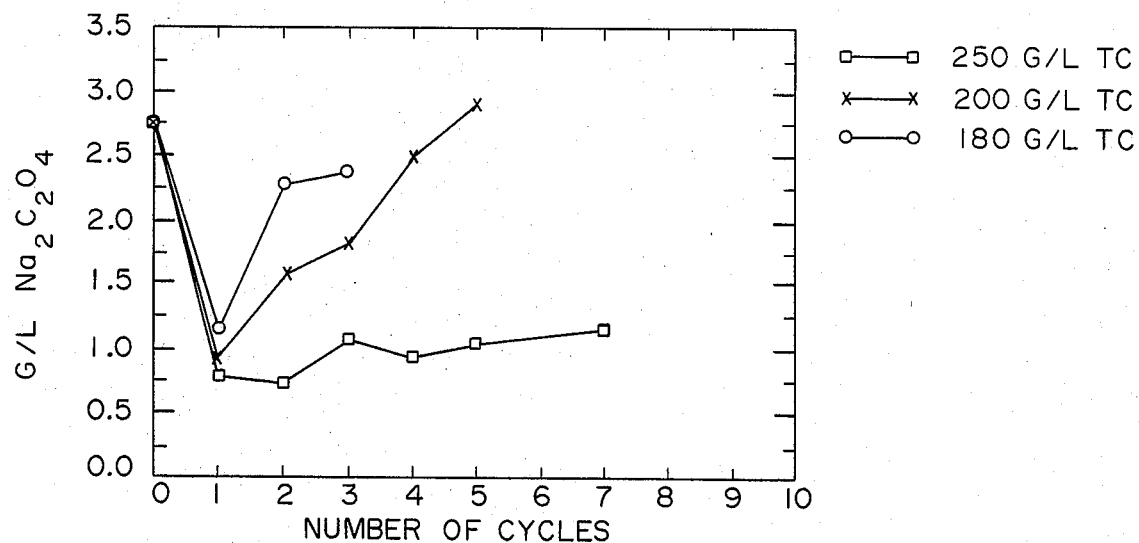
FIG.5 - OXALATE REMOVAL BY ALCOHOL EXTRACTION

RECOVERY OF ALUMINUM FROM SPENT LIQUOR

CROSS-REFERENCE TO RELATED APPLICATIONS

This application is a continuation in part of U.S. patent application Ser. No. 453,353 filed Dec. 27, 1982 now U.S. Pat. No. 4,464,347, and U.S. patent application Ser. No. 587,589 filed Mar. 8, 1984 now U.S. Pat. No. 4,496,524.

BACKGROUND OF THE INVENTION

This invention relates to refining of ore containing aluminum compounds. More particularly, this invention relates to an improved process for purifying spent liquor from a Bayer-type process prior to recycling the spent liquor back to the digest.

Ores containing aluminum compounds, more particularly bauxite type ores, are conventionally digested in caustic by the well-known Bayer Process to form a solution of sodium aluminate and sodium hydroxide. The solid bauxite residue (red mud) is then separated from the solution by clarification and, after washing to remove as much caustic content as economically feasible, is discarded. Alumina is recovered by precipitation from this solution by first cooling the solution to supersaturation and then seeding with aluminum trihydroxide. The spent mother liquor is then recycled back to the digester, after an evaporation step, for reuse of the caustic therein and to preserve the alumina values remaining in the spent liquor after precipitation.

Unfortunately, however, such ores may contain or form many other soluble compounds, such as sulfates, fluorides and carbonates which, due to their solubility, are not removed in the clarification step. These unwanted impurities can build up in concentration with repeated recycling of the spent liquor which can retard the recovery of alumina from solution, deposit scale on equipment (particularly heaters), reduce evaporation efficiencies, increase the required plant size (for given throughput) and operating costs due to the circulating liquor loads and increase the impurity level in the product. It would, therefore, be desirable to efficiently separate out such impurities from the Bayer liquor.

Malito et al U.S. Pat. No. 4,430,310 proposes a process for removing impurities from Bayer process using an organic solvent, such as methanol, methanol-isopropanol, and methanol-butanol mixtures. However, since these alcohols do not separate from the spent liquor into a separate phase, subsequent separation of the organic solvent from the spent liquor must be accomplished, such as by evaporation.

The yield of alumina in the precipitation step is further influenced by the ratio of alumina to caustic in the liquor. As the caustic level rises, due to depletion of alumina by precipitation, further precipitation of alumina is inhibited. This is sometimes overcome by neutralization of the sodium hydroxide, e.g., with sodium bicarbonate. However, this requires further reprocessing of the neutralized liquor to recover the soda for reuse in the digester.

If the caustic in the spent liquor could be selectively removed after the initial precipitation of alumina, the spent liquor stream could be reseeded and further alumina values could be precipitated from the spent liquor, prior to further treatment of the spent liquor to remove impurities.

Halff et al U.S. Pat. No. 3,511,606 discloses a process for treating solutions containing sodium hydroxide, such as Bayer Process liquors, with ethanol to extract the sodium hydroxide after separating out the aluminate sludge.

Aluminum-bearing ores, such as bauxite, also contain organic materials which are a composite of many substances described by such terms as humic, lignin, cellulose and protein. In caustic digestion processing, commonly known as Bayer processing, a portion of this organic matter is extracted into the liquor during digestion and is decomposed to form soluble sodium organic compounds. One of these degradation products has been identified as sodium oxalate. With recycling (for economic reasons) of the liquor after precipitation of aluminum hydroxide, the sodium oxalate concentration increases until an equilibrium concentration is reached.

Although it is known that pure sodium oxalate in the usual concentration of Bayer spent liquor, i.e., 180 grams/liter total caustic (TC), has little effect on the precipitation of aluminum hydroxide, plant oxalate, that is, oxalate which accumulates in the ore refining process and which is defined to include degraded organic materials, has been blamed for inhibiting precipitation of aluminum hydroxide. When this plant sodium oxalate concentration builds up to a critical supersaturated concentration, then it coprecipitates with the aluminum hydroxide giving rise to aluminum hydroxide fines and interfering with agglomeration of the aluminum hydroxide fines in the precipitation process. This causes serious problems in separating the fine aluminum hydroxide crystals from the mother liquor, resulting in more fine aluminum hydroxide being recycled back to digestion thereby decreasing the overall aluminum hydroxide yield. In order to obtain aluminum hydroxide product, having large particles formed, at least in part, by means of agglomeration, it is necessary to remove at least a portion of the sodium oxalate from the liquor stream. This reduces the accumulation of sodium oxalate and depresses its coprecipitation with aluminum hydroxide crystals in solution.

Several methods have been proposed to reduce the sodium oxalate concentration in caustic liquor. Byrns U.S. Pat. No. 3,337,305 proposes addition of ammonia to a caustic liquor containing oxalates to cause a precipitation of sodium oxalate salts. Yamada et al U.S. Pat. No. 3,899,571 provides for the removal of sodium oxalate by the addition of sodium oxalate seed crystals to a spent liquor to precipitate organic substances, mainly composed of sodium oxalate, which are then removed from the spent liquor.

Breteque U.S. Pat. No. 3,457,032 discloses a process for the purification of sodium aluminate obtained by alkaline digestion of bauxite which comprises treating the solution with strongly basic anion exchange resins of a macroreticular type to eliminate metal ion and organic acid impurities. Lever U.S. Pat. No. 4,275,042 describes the removal of sodium oxalate from Bayer spent liquor by treating the liquor with a cationic sequestrant which interacts with the humic material in the spent liquor to remove it and thereby destabilize the solution with respect to precipitation of sodium oxalate. The patentees also used seed crystals to expedite the precipitation of the sodium oxalate after the removal of the humic material. Gnyra U.S. Pat. No. 4,275,043 describes the removal of oxalate, generally as a disodium salt, from Bayer process liquor by treating the liquor with an adsorbent, such as activated carbon, to remove sufficient of the humic matter in the liquor to destabilize the sodium oxalate and cause it to precipitate.

Sato et al U.S. Pat. No. 3,649,185 describes a process for the removal of sodium oxalate from a spent liquor by increasing the caustic concentration of the liquor as well as controlling the temperature to develop supersaturation. The patentees further point out that the crystallized sodium oxalate is contained mainly in the finer part of the crystals and that this is used for further separation of the sodium oxalate.

In Bush U.S. patent application, one of us found that ethanol could be used to initially extract sufficient caustic from a Bayer spent liquor to permit a further precipitation of alumina following which the resulting spent liquor could be purified to remove sulfate and fluoride salts by further extraction of caustic with ethanol.

Subsequently we found in Bush et al U.S. patent application Ser. No. 587,589 that if 50 volume % or less of ethanol was used in an initial treatment of Bayer spent liquor, a sodium oxalate precipitate could be formed while the alumina values stayed in solution.

SUMMARY OF THE INVENTION

It is, therefore, an object of the invention to provide a treatment system for separating sufficient caustic from a Bayer spent liquor to initially precipitate sodium oxalate without precipitating the alumina values in the spent liquor.

It is another object of the invention to provide a system for treatment of spent liquor from a precipitation stage to remove sufficient caustic to initially precipitate sodium oxalate followed by a subsequent treatment of the spent liquor to remove enough caustic to raise the alumina/caustic ratio sufficiently to permit a second precipitation of alumina from the treated spent liquor.

It is yet another object of the invention to provide a system wherein impurities introduced into the digestion and precipitation system can be removed.

It is a still further object of the invention to provide a system for treating spent liquor to remove such impurities without contaminating the desired precipitate.

These and other objects of the invention will become apparent from reading the description of the invention and the accompanying drawings.

In accordance with the invention, spent liquor from an alumina precipitation stage is first contacted with 50 volume % or less ethanol to form a sodium oxalate precipitate and then is contacted with over 50 volume % of ethanol to separate the mixture into a first layer comprising the ethanol and at least a portion of the caustic from the spent liquor and a second layer which comprises the remainder of the spent liquor. The spent liquor is then subjected to a further precipitation to recover further alumina. The spent liquor remaining is then further treated in subsequent extraction steps to concentrate and dispose of undesirable impurities remaining.

BRIEF DESCRIPTION OF THE DRAWINGS

FIG. 2 is a flow sheet illustrating another embodiment of the invention.

FIG. 3 is a graph plotting oxalate extraction against ethanol used at three total caustic concentrations.

FIG. 4 is a graph showing the amount of ethanol recovered from the prior cycle of ethanol extraction as a function of the number of previous cycles for various total caustic concentrations, FIG. 5 is a graph showing the amount of oxalate removed at each cycle of ethanol extraction at various total caustic centrations.

DESCRIPTION OF THE INVENTION

Spent liquor from an alumina precipitation, such as the precipitation of green liquor from the well-known Bayer Process contains both caustic and alumina values. The ratio of alumina to caustic, however, is about 50 g/l $AL_2O_3$ and 160 g/l caustic (as $Na_2CO_3$) which is too low an alumina to caustic ratio to permit further recovery of the alumina values by further precipitation. In accordance with the invention, the spent liquor is contacted with an a extraction fluid such as ethanol which is capable of selectively extracting caustic from the spent liquor.

The extraction fluid, in addition to its selectivity for the caustic values, must be partially immiscible in the spent liquor forming two layers which can subsequently be easily separated from one another. Furthermore, the extraction fluid must be chemically capable of withstanding the caustic conditions under elevated temperatures not exceeding its boiling point without decomposition or degradation.

In a preferred embodiment, the extraction fluid comprises an ethyl alcohol which may be substantially pure or have up to 10 vol. % of denaturing ingredients, such as methanol, benzene, or the like, or inorganic denaturing agents. It has been found that ethanol, unlike its nearest homologs, methanol and propyl alcohols, will, upon contact with spent liquor, extract caustic, leaving a separate liquid layer comprising the spent liquor having an alumina to caustic ratio up to that of a green liquor, thus permitting easy separation of the two phases and a second precipitation from the liquor in the remaining aqueous phase to recover further alumina values from the treated liquor prior to subjecting the treated liquor to further purification steps to remove inorganic impurities.

The ethanol is used in amounts of over 50 volume % of the volume amount of the spent liquor from which the caustic is to be extracted. In a particularly preferred embodiment, the spent liquor is first treated with ethanol in an amount not exceeding 50 volume % of the spent liquor to permit a selective precipitation of sodium oxalate and impurities from the lower, aqueous layer as taught in our copending U.S. patent application Ser. No. 587,589, cross-reference to which is hereby made.

After removal of the oxalate precipitate, the remaining spent liquor is then treated with over 50 volume % ethanol, in accordance with the invention, to extract sufficient caustic in the upper, ethanol phase to bring the caustic/alumina ratio in the lower, aqueous phase back to approximately that of a green liquor to permit recovery of further alumina values.

Figure 1:
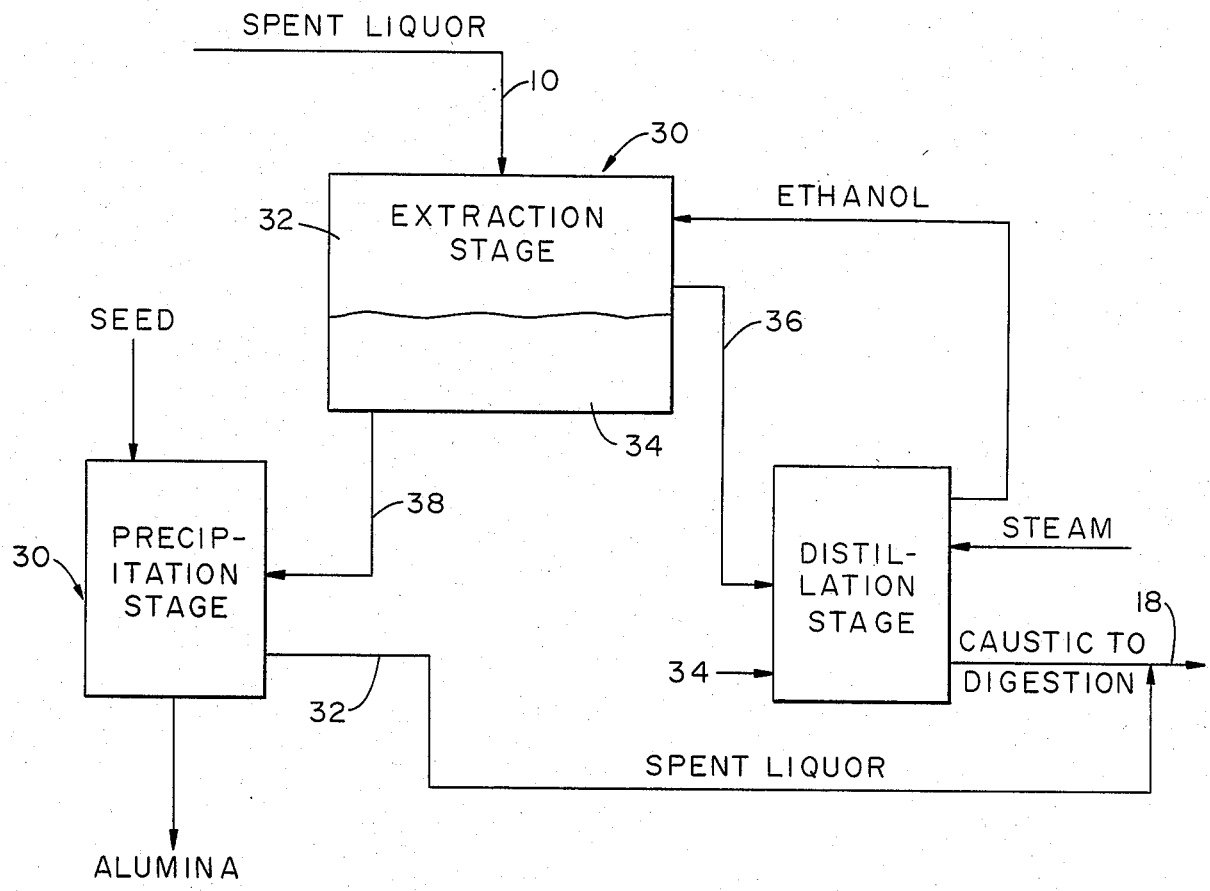
FIG. 1 is a flow sheet illustrating an elemental form of one embodiment of the invention.

Referring now to FIG. 1, the invention is illustrated in its most elemental form. A spent liquor stream 10 from a precipitation stage, such as a Bayer precipitation, is contacted at extraction stage 30 with over 50 volume % of an extraction fluid, such as ethanol. The ethanol/caustic layer 32 is passed to distillation stage 34 via line 36, and the ethanol is separated from the caustic. The caustic is returned to the digestion plant via line 18 while the ethanol is recycled back to extraction stage 30.

The lower layer 34, which now comprises a sodium aluminate solution having an aluminate solution having an alumina/caustic ratio up to a green liquor, is passed via line 38 to precipitation stage 30. The liquor stream is seeded with aluminum trihydroxide to form a precipitate of alumina. The precipitated alumina hydrate is then recovered and blended with alumina hydrate from the Bayer precipitate while the resulting spent liquor stream 32 may be combined with caustic stream 18 for return to the digester or recycled.

While the foregoing describes the extraction in its simplest from wherein additional alumina values can be precipitated for a given amount of digestion of ore, the invention finds its greater value in a multiple stage process wherein the spent liquor is first treated to precipitate sodium oxalate then, after extraction of sufficient caustic to permit precipitation of alumina, at least a portion of the spent liquor from the additional precipitation stage is further treated in subsequent extraction stages to remove other impurities in the system which may have been introduced via the ore and which, in any event, tend to build up in continuous recycling.

Referring now to FIG. 2, a stream 35 of Bayer spent liquor (that is, Bayer-type process liquor previously subjected to a precipitation to remove a majority of the aluminum hydroxide values therein) containing sodium oxalate compounds is blended with ethanol in a stirred reactor 36. The ethanol may comprise fresh makeup ethanol from stream 37 or recycled ethanol from line 50, as will be described below.

The amount of ethanol used for the initial oxalate precipitation, by volume percent, should not exceed 50% of the spent liquor volume and may be as low as 5%. If higher than 50% is used, the amount of caustic extracted from the spent liquor may lower the caustic-/alumina ratio in the spent liquor sufficiently to cause premature precipitation of aluminum hydroxide with the oxalate compounds. This will either cause loss of alumina values or necessitate a further separation of the alumina from the oxalate. Preferably, the amount of ethanol used is 10 to 50 vol. % and most preferably 30 to 50 vol. %. The higher percentage by volume of ethanol used is found to lower the solubility of the oxalate in the aqueous spent liquor phase causing a higher precipitation of the oxalate compounds. FIG. 3 illustrates the effectiveness of the oxalate removal at three different concentrations of caustic plotted against the volume of ethanol used.

After the spent liquor and ethanol have been thoroughly mixed, the liquid mixture is passed into a separator 38 in which the mixture is allowed to separate into two layers. Top layer 39 comprises a majority of the ethanol together with some of the caustic liquor which is extracted from the spent liquor. Bottom layer 26 comprises mainly the spent liquor as well as a minor amount of ethanol which equilibrates (i.e., is absorbed) into the aqueous or spent liquor phase. This separation decreases the oxalates solubility in the aqueous phase causing a portion of the oxalate to precipitate. Following the separation, the lower phase or layer 41 containing both the spent liquor and the oxalate precipitate is passed into holding tank 40 by opening valve 42 in line 44 which interconnects separator 38 with holding tank 40. After the bottom layer 41 has been drained from separator 38, valve 42 is closed and a second valve 48, on a branch line 50, which interconnects with line 44 above valve 42, is opened; and the top layer 39, which comprises most of the ethanol, is recycled back, via line 50, to stirred reactor 36 for further reaction with spent liquor.

The spent liquor/oxalate precipitate slurry is passed from holding tank 40 into a filtration stage 56 where the oxalate precipitate is filtered out and removed. The remaining spent liquor is then passed into a flash tank 60 where any alcohol in the spent liquor is flashed off and passed via line 66 to condenser 70. The alcohol vapors are condensed in condenser 70 and passed via line 74 to branch line 50 wherein they merge with the ethanol from top layer 39 for recycling back to reactor 36 for use in extraction of further Bayer spent liquor.

The concentration of the spent liquor may vary from 180 to as high as 250 grams per liter total caustic (TC) expressed as sodium carbonate equivalent with a preferred concentration being at least 200 grams per liter. Concentrations of around 250 grams per liter have been found to be more effective in removing sodium oxalate. It will be understood that amounts greater than 250 grams per liter are not presently known to adversely affect the process. While normal Bayer-type spent liquor usually has a nominal concentration of 180 grams/liter TC, the higher concentration of liquor has been found to result in a higher amount of precipitation of sodium oxalate as shown in the graph of FIG. 3. Furthermore, it has been found that when higher amounts of ethanol are used, i.e., up to 50 vol. %, with higher concentrations of caustic up to 250 grams per liter, relatively less ethanol equilibrates in the aqueous phase so that more ethanol can be recovered and reused for up to seven cycles. In FIG. 4, there is shown the number of milliliters of ethanol recovered from the previous cycle 100 milliliters initially used at three different caustic concentrations. As seen in FIG. 4, at a lower caustic concentration of 180 grams per liter total caustic, less ethanol volume, can be recovered to be reused for the successive treatments. Furthermore, as shown in FIG. 5, the recycled ethanol has been found to be not as effective at lower caustic concentrations in removing the oxalate from the liquor stream for reasons which are not entirely understood, possibly due to the dilution of ethanol with water from the aqueous phase.

To illustrate the process of this embodiment of the invention, various amounts of 95% ethanol ranging from 5 vol. % to 50 vol. % were added to spent liquor having nominal total caustic (TC) concentrations of 180, 200 and 250 grams per liter (measured as sodium carbonate). The more concentrated TC solutions were made by concentrating aliquots of normal 180 grams/liter TC Bayer spent liquor. The results are shown in Table I where it will be seen that the higher volume percent ethanol added to a higher concentration of total caustic results in the most effective removal of oxalate from the spent liquor. The amounts of sodium oxalate, listed as remaining after the extraction, are corrected to reflect the amount in a 180 grams/liter TC concentration to enable more meaningful comparison of the data.

TABLE I

| Sample Number | 95% Ethanol Added ml/100 ml liq. | Temp. °C. | Liquor Analysis, g/l | | | | |
|---|---|---|---|---|---|---|---|
| | | | Total Caustic | | Total Alkali | Alumina | Sodium Oxalate |
| | | | Nominal | Actual | | | |
| Control | | 50 | 180 | 177.0 | 236.4 | 70.4 | 2.46 |
| 1 | 5 | 50 | 180 | 171.7 | 234.2 | 69.4 | 2.31 |
| 2 | 10 | 50 | 180 | 164.3 | 224.7 | 66.6 | 2.26 |
| 3 | 20 | 50 | 180 | 162.2 | 221.6 | 66.3 | 1.93 |
| 4 | 30 | 50 | 180 | 167.5 | 232.2 | 70.9 | 1.77 |
| 5 | 50 | 50 | 180 | 182.9 | 256.0 | 80.2 | 1.32 |
| 6 | 5 | 50 | 200 | 196.1 | 267.1 | 79.6 | 2.40* |
| 7 | 10 | 50 | 200 | 188.2 | 257.1 | 77.2 | 1.87* |
| 8 | 20 | 50 | 200 | 189.7 | 261.8 | 79.1 | 1.35* |
| 9 | 30 | 50 | 200 | 204.1 | 275.9 | 84.7 | 1.05* |
| 10 | 50 | 50 | 200 | 214.7 | 292.7 | 91.7 | 0.83* |
| 11 | 5 | 50 | 250 | 242.8 | 330.7 | 99.2 | 0.92* |
| 12 | 10 | 50 | 250 | 254.5 | 338.8 | 99.0 | 0.74* |
| 13 | 20 | 50 | 250 | 249.5 | 336.8 | 102.4 | 0.74* |
| 14 | 30 | 50 | 250 | 253.4 | 342.2 | 104.8 | 0.71* |
| 15 | 50 | 50 | 250 | 253.8 | 343.3 | 106.9 | 0.76* |

*Sodium Oxalate concentration corrected to reflect amount in 100 ml of 180 grams/liter TC liquor prior to concentration.

As stated previously, the ethanol is recycled back to react with further spent liquor. However, it has been found that the recycled ethanol loses its effectiveness after about five to seven recyclings, apparently due to dilution with water from the aqueous phase. After seven cycles, the ethanol should be further processed to remove the caustic which may then be recycled back with the purified spent liquor to the ore digestion stage (i.e., the Bayer processing plant). The ethanol may be purified by flash evaporation of the ethanol followed by condensing. The caustic residue would then be recycled back to digestion. FIG. 5 shows the amount of oxalates removed at the various liquor concentrations for each cycle of reuse of the ethanol.

The top layer 24, which contains principally the ethanol and caustic liquor extracted therewith, may also contain a minor amount of oxalate precipitate. If this occurs to any major extent, the precipitate may be filtered out prior to recycling of the ethanol back to stirred reactor 10 for further extraction of the spent liquor.

Figure 6:
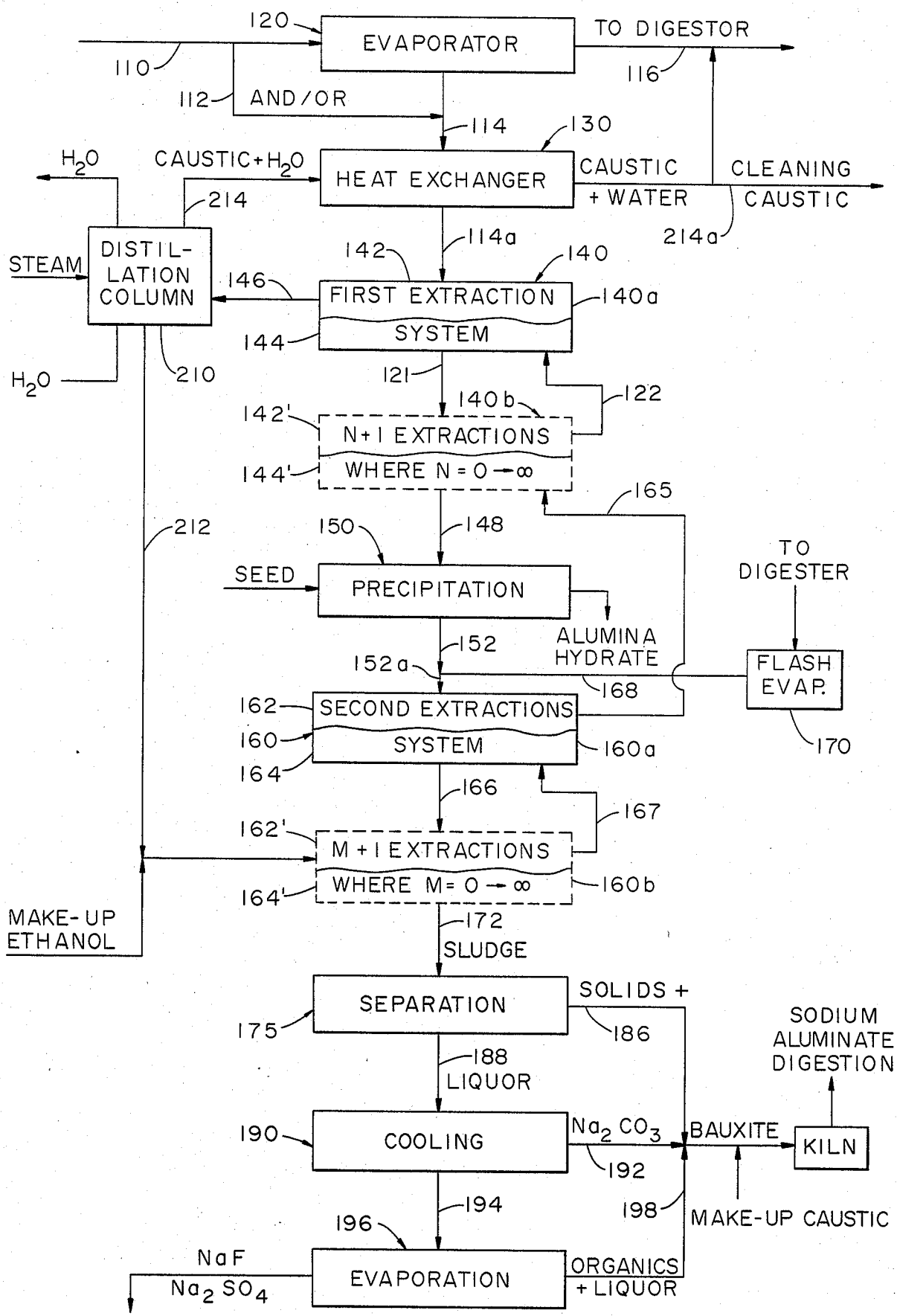
FIG. 6 is a flowsheet showing an expanded form of the process shown in FIG. 1.

Referring now to FIG. 6, a spent liquor stream 110 from either a Bayer precipitation (not shown) or the oxalate removal process just described may be optionally concentrated by evaporation by evaporator 120 or evaporator 120 may be bypassed in whole or in part by line 112. The concentrated spent liquor may then be split into two streams if only a portion of the spent liquor is to be subjected to the separation process of the invention. If the spent liquor is split into two streams, stream 116 may be returned directly to the digestion stage.

The main spent liquor stream 114 may be passed through heat exchanger 130 to heat output caustic stream 214 which has already been processed and is to be fed back to the digestion stage after blending with stream 116.

The cooled spent liquor stream 114a is then contacted with the extraction fluid in first extraction system 140 which, as illustrated in FIG. 6, may comprise two or more extraction stages with the first stage denoted as 140a and the additional stages denoted as 140b.

Most of the caustic values, i.e., NaOH or the like, combine with the extraction fluid into one layer 142. Layer 142, containing the extraction fluid and caustic, passes via stream 146 to distillation stage 210. The extraction fluid, if more volatile than the caustic (e.g., ethanol), is distilled off and passed to second extraction system 160 via line 212. The caustic residue stream 214 may be passed through heat exchanger 130 prior to blending with stream 116 for recycling back to the digester. A cleaning caustic side stream 214a may be tapped off stream 214 prior to combination with stream 116 for cleaning of equipment.

The remaining constituents in cooled spent liquor stream 114a, principally a sodium aluminate/caustic solution having an alumina/caustic ratio similar to green liquor and impurities, separate into another layer 144. Layer 144 is passed to the additional stage or stages 140b (noted in the drawing as n−1 extractions where n equals 2 to infinity) via line 120 where it is contacted with extraction fluid causing separation into layers 142' and 144'. Layer 142', which contains the extraction fluid and caustic, is cycled back to stage 140a via line 122. Layer 144' is passed to a precipitation stage 150 via stream 148 where the liquor is seeded with aluminum trihydroxide to precipitate alumina hydrate. The precipitated alumina may then be combined with the alumina precipitated from the Bayer Process.

In accordance with a second aspect of the invention, other impurities in the spent liquor are now separated out. Such impurities tended to build up in the conventional prior art process where the spent liquor from a Bayer precipitation is recycled directly back to the digestion stage. To accomplish this further separation, the spent liquor from the precipitation stage 150 is fed as a stream 152 to second extraction system 160. Stream 152 may optionally be separated into two streams 152a and 168. Stream 168 is flashed at 170 to remove any remaining separation fluid and the spent liquor is then returned to the digestion stage.

Spent liquor stream 152a is contacted in second extraction system 160 by extraction fluid from distillation stage 210 via stream 212. Extraction system 160 comprises two or more extraction stages with the first stage indicated as 160a and the additional stages being denoted as 160b. The fluids in stage 160a separate into layers 162 and 164. Layer 162 contains the caustic values and the extraction fluid while the remainder of the spent liquor, including dissolved impurities, separate into a second layer 164. The caustic/extraction fluid layer 162 may be recirculated back to first extraction system 140 via line 165.

Layer 164 is passed to the additional stage or stages 160*b* (noted in FIG. 6 as m−1 where m equals 2 to infinity) via line 166 where it is contacted with fresh extraction fluid entering system 160 from distillation stage 210 via stream 212 as previously discussed. Two layers, 162' and 164', are formed. Layer 162', comprising the caustic and extraction fluid, is passed back to stage 160*a* by line 167.

Layer 164' ultimately forms a precipitate or sludge 172 consisting principally of sodium aluminate, particularly when second extraction system 160 comprises a multistage extraction. Liquor from system 160 and the sodium aluminate sludge or precipitate 172 are then removed and moved to separation stage 175. Liquor from stage 175 then passes through line 188 to cooling stage 190 where the liquid is cooled to 0° C. resulting in a sodium carbonate precipitate 192. The remaining liquid in cooling stage 190 exits via line 194 and is then concentrated at evaporation stage 196, causing sodium sulfate and sodium fluoride to precipitate. These salts are then removed and either further processed to recover soda values or disposed of. The remaining fluid in line 198, containing principally caustic and organics, may be combined with the sodium carbonate in line 192 from cooling stage 190 and the solids in line 186 from separation stage 175 and recycled back to the kiln. There the organics may be burned off and the sodium carbonate treated with lime to form calcium carbonate and sodium hydroxide. The caustic may be then recycled back to the Bayer process and reacted with fresh bauxite ore.

Distillation stage 210, which is used to recover the extraction fluid, preferably comprises at least two distillation columns in series. When the extraction fluid comprises ethanol, the feed to the second column will comprise about 70% ethanol and 30% water, and the second column will yield a top layer of about 95% ethanol and 5% water with the bottom layer of water containing only a trace of alcohol.

Thus, the invention provides an improved process for the purification of spent liquor and the further recovery of alumina from ore wherein a second precipitation, after extraction of caustic from spent liquor, permits recovery of a greater yield of alumina from a given amount of green liquor from a digestion process. The invention permits the initial removal of oxalates and the subsequent removal of other undesired impurities from the digestion-precipitation loop, thus reducing scale build-up on equipment and downtime for cleanup as well as increasing the overall purity of the alumina product.

Having thus described the invention, what is claimed is:

1. A process for the purification of a Bayer spent liquor from a Bayer-type caustic digestion process to remove impurities therein which comprises:
   (a) contacting said spent liquor with up to 50 vol. % ethanol to form two layers comprising, respectively, ethanol and spent liquor;
   (b) separating the spent liquor layer from said ethanol layer;
   (c) filtering said spent liquor layer to remove precipitated organic impurities;
   (d) contacting said filtered spent liquor with over 50 volume % ethanol to form a first, upper layer comprising said ethanol and sufficient extracted caustic values from said spent liquor, whereby said lower, spent liquor layer will have a ratio of alumina to caustic sufficient to permit further precipitation of alumina values from said liquor;
   (e) subjecting said lower, spent liquor layer to a precipitation to remove further alumina values;
   (f) treating at least a portion of the spent liquor from said second precipitation to remove at least a portion of the sulfate and fluoride impurities therein, said treatment including contacting said portion of spent liquor from said spent liquor with ethanol; and
   (g) recycling said purified spent liquor back to said digestion process.

2. The process of claim 1 wherein said ethyl alcohol used to treat said spent liquor from said second precipitation comprises ethyl alcohol recovered from separating the caustic in said first layer from said ethyl alcohol initially used to treat spent liquor from the first precipitation.

3. The process of claim 1 wherein said further treatment of spent liquor with ethyl alcohol results in the formation of a sodium aluminate sludge which is separated from the remaining spent liquor solution.

4. The process of claim 3 wherein said spent liquor solution also contains sodium carbonate and, after separation from said sodium aluminate sludge, includes the further step of cooling said spent liquor solution to form a sodium carbonate precipitate which is then removed from said solution.

5. The process of claim 4 including the further step of evaporating said spent liquor solution, after removal of said sodium carbonate precipitate, to form a precipitate comprising sodium fluoride and sodium sulfate.

6. The process of claim 5 including the steps of separating said spent liquor solution from said sodium fluoride and sodium sulfate precipitate and recycling said solution back to the digestion of ore.

7. The process of claim 4 including treating said sodium carbonate precipitate to extract caustic values and recycling said caustic values back to the digestion of ore.

* * * * *